United States Patent [19]
Bredt

[11] Patent Number: 5,660,621
[45] Date of Patent: Aug. 26, 1997

[54] BINDER COMPOSITION FOR USE IN THREE DIMENSIONAL PRINTING

[75] Inventor: James F. Bredt, Watertown, Mass.

[73] Assignee: Massachusetts Institute of Technology, Cambridge, Mass.

[21] Appl. No.: 581,319

[22] Filed: Dec. 29, 1995

[51] Int. Cl.$^6$ .............................. C04B 22/06; C09D 1/00; C09D 1/04; C09D 7/12
[52] U.S. Cl. .................... 106/287.34; 106/600; 106/634; 106/636; 106/638; 106/802; 106/808; 106/816; 106/287.23; 106/287.25
[58] Field of Search .................... 106/287.34, 287.23, 106/287.25, 600, 634, 636, 638, 802, 808, 816

[56] References Cited

U.S. PATENT DOCUMENTS

| | | | |
|---|---|---|---|
| 2,671,741 | 3/1954 | Duvall | 134/2 |
| 2,985,939 | 5/1961 | Brockman | 25/157 |
| 3,302,655 | 2/1967 | Sasaki et al. | 134/79 |
| 3,451,401 | 6/1969 | Levinson | 134/58 |
| 3,868,267 | 2/1975 | Gazza et al. | 117/22 |
| 3,887,392 | 6/1975 | Tang | 134/1 |
| 3,990,906 | 11/1976 | Johnson et al. | 134/1 |
| 3,999,188 | 12/1976 | Yamada | 346/75 |
| 4,122,458 | 10/1978 | Paranjpe | 346/75 |

(List continued on next page.)

FOREIGN PATENT DOCUMENTS

| | | |
|---|---|---|
| 0431924A2 | 6/1991 | European Pat. Off. . |
| 0446934A2 | 9/1991 | European Pat. Off. . |
| 0470705A2 | 12/1992 | European Pat. Off. . |
| 54-9132 | 4/1979 | Japan . |
| 2111528 | 4/1990 | Japan . |
| 2307737 | 12/1990 | Japan .............. B29D 17/00 |
| 4061328 | 2/1992 | Japan .............. H01L 21/04 |
| WO9003893 | 4/1990 | WIPO .............. B44C 1/22 |
| WO9220505 | 11/1992 | WIPO . |

OTHER PUBLICATIONS

R. Sweet, "High–Frequency Recording with Electrostatically Deflected Ink Jets", The Review of Scientific Instruments, vol. 36, No. 2, pp. 131–136, (1965).

C. Deckard, et al., "Solid Freeform Fabrication and Selective Powder Sintering", NAMRC Proceedings, Symposium #15, (undated).

H. Kodama, "Automatic Method for Fabrication a Three–Dimensional Plastic Model with Photo–Hardening Polymer", Review of Scientific Instruments, vol. 52, No. 11, (Nov., 1981).

T. Wohlers, "Creating Parts by the Layers", Cadence, pp.73–76, (Apr., 1989).

Database WPI, Section PQ, Week 9103, Derwent Publications Ltd., London, GB; Class P, p. 43, AN 91–020238, & SU–A–1 563 787 (Suchkov, A.G.), 15 (May, 1990).

*Primary Examiner*—David Brunsman
*Attorney, Agent, or Firm*—Weingarten, Schurgin, Gagnebin & Hayes LLP

[57] ABSTRACT

A binder composition for three dimensional printing of parts is disclosed which is stable during storage and passage through a printhead, yet able to gel under the conditions existing in a powder bed. The binder composition comprises colloidal silica, a catalyst able to promote gelation of the composition when the composition is below a predetermined pH value, and a base able to maintain the pH of the composition above the predetermined value at which the composition gels. Preferably, the catalyst is polyethylene glycol or another ethylene oxide-derived polymer, and the base is triethanolamine. Upon impact with a powder bed, the pH of the binder composition is reduced, as by adding an acid such as citric acid to the powder, thereby causing the binder to gel in the powder.

29 Claims, 2 Drawing Sheets

U.S. PATENT DOCUMENTS

| | | | |
|---|---|---|---|
| 4,129,875 | 12/1978 | Ito et al. | 346/75 |
| 4,158,204 | 6/1979 | Kuhn et al. | 346/75 |
| 4,235,246 | 11/1980 | Weiss | 128/785 |
| 4,247,508 | 1/1981 | Housholder | 264/219 |
| 4,294,805 | 10/1981 | Hodgson et al. | 423/4 |
| 4,299,239 | 11/1981 | Weiss et al. | 128/785 |
| 4,420,446 | 12/1983 | Wieder et al. | 264/40.6 |
| 4,472,668 | 9/1984 | Mutschler et al. | 318/568 |
| 4,504,322 | 3/1985 | Adwalpalker et al. | 134/1 |
| 4,561,902 | 12/1985 | Lee | 134/1 |
| 4,575,330 | 3/1986 | Hull | 425/174.4 |
| 4,579,380 | 4/1986 | Zaremsky et al. | 294/119.1 |
| 4,636,341 | 1/1987 | Murley | 264/37 |
| 4,642,653 | 2/1987 | Ito et al. | 346/1.1 |
| 4,665,492 | 5/1987 | Masters | 364/468 |
| 4,675,216 | 6/1987 | DuForest et al. | 427/56.1 |
| 4,791,022 | 12/1988 | Graham | 428/324 |
| 4,791,434 | 12/1988 | Wills | 346/75 |
| 4,818,562 | 4/1989 | Arcella et al. | 427/53.1 |
| 4,863,538 | 9/1989 | Deckard | 156/62.2 |
| 4,876,455 | 10/1989 | Sanderson et al. | 250/60 |
| 4,929,402 | 5/1990 | Hull | 264/22 |
| 4,935,055 | 6/1990 | Aghajanian et al. | 164/66.1 |
| 4,988,202 | 1/1991 | Nayar et al. | 356/394 |
| 5,016,683 | 5/1991 | Latka | 141/1 |
| 5,053,090 | 10/1991 | Beaman et al. | 156/62.2 |
| 5,059,266 | 10/1991 | Yamane et al. | 156/64 |
| 5,076,869 | 12/1991 | Bourell et al. | 156/62.2 |
| 5,079,974 | 1/1992 | Weiss et al. | 76/107.1 |
| 5,121,329 | 6/1992 | Crump | 364/468 |
| 5,126,529 | 6/1992 | Weiss et al. | 219/121.6 |
| 5,136,515 | 8/1992 | Helinski | 364/468 |
| 5,147,587 | 9/1992 | Marcus et al. | 264/22 |
| 5,189,781 | 3/1993 | Weiss et al. | 29/527.2 |
| 5,203,944 | 4/1993 | Prinz et al. | 156/247 |
| 5,204,055 | 4/1993 | Sachs et al. | 419/2 |
| 5,207,371 | 5/1993 | Prinz et al. | 228/125 |
| 5,278,442 | 1/1994 | Prinz et al. | 257/417 |
| 5,281,789 | 1/1994 | Merz et al. | 219/76.15 |
| 5,286,573 | 2/1994 | Prinz et al. | 428/457 |
| 5,301,415 | 4/1994 | Prinz et al. | 29/458 |
| 5,301,863 | 4/1994 | Prinz et al. | 228/33 |
| 5,312,456 | 5/1994 | Reed et al. | 411/456 |
| 5,340,656 | 8/1994 | Sachs et al. | 428/546 |
| 5,387,380 | 2/1995 | Cima et al. | 264/69 |

BINDER COMPOSITION FOR USE IN THREE DIMENSIONAL PRINTING

FIELD OF THE INVENTION

This invention relates to three dimensional printing and more particularly to binders used in three dimensional printing.

BACKGROUND OF THE INVENTION

Three dimensional printing is a process for manufacturing tooling and prototype parts in a layered fashion. A powdered material is deposited in a layer and bound in selected regions, defined by a computer model of the part, by a liquid binder material which is applied to the layer of powdered material using an ink-jet printhead. These steps are repeated layer by layer to build up the part. Commonly used powders include aluminum oxide, zirconium silicate, fused silica, stainless steel, tungsten, and silicon carbide. Colloidal silica is primarily used as the binder for the ceramics and Acrysol® latex emulsion for the metals. After printing of all the layers, the part is treated in a manner appropriate to the part and the materials chosen, for example by sintering, and unbound powder is removed. The process is shown generally in FIG. 1. See, e.g., U.S. Pat. No. 5,204,055.

To form mechanically strong bonds between powder particles, 6 to 10% of the material comprising the finished part must be in the form of welds between powder grains. If the welds are composed of adhesive dispensed by the printhead, then the liquid binder must contain approximately the same percentage (6 to 10% by volume) of solids. Few inorganic substances are soluble to this degree. Thus, the solids carried by the binder are generally dispensed as a dispersion of solid particles in a liquid carrier, a colloid.

The binder is often stored for a few months on the shelf or in the reservoir; The binder is usually driven from the reservoir by gas pressure and passes through a number of fittings, tubing, and filters before reaching the printhead. Most binder passing through the printhead nozzles lands in the collection gutter or catcher and is carried off by a secondary fluid pumping system. The binder is often recycled, particularly with multiple jet printheads.

As the printhead is swept over the powder bed, the binder is formed into a stream of droplets which impact the powder bed and overlap one another, thereby merging to from a linear strip having a cylindrical cross-section across the powder. Once the liquid comes substantially to rest in the powder, the primary driving force for further-movement is capillary attraction which can exert its influence until some mechanism causes the binder solids to be immobilized, as by drying the binder, for example, by heating or directing an air flow over the layer. FIG. 2 illustrates the sequence from jet impact to immobilization.

Printhead failure mechanisms include drying of the binder on the nozzle and the clogging of the nozzle by solid material in the binder feed. Large (50 µm) solid particles can find their way into the binder if the sol dries on tube fittings when connections are broken, and they can also form by gradual flocculation of the sol if its stability is not sufficiently high.

SUMMARY OF THE INVENTION

The present invention provides a binder composition for use in three dimensional printing of parts which becomes immobilized in the printed region of a powder layer and does not migrate to unprinted regions. The binder includes a catalyst which controls the immobilization in the powder. The invention also relates to a process for forming parts using three dimensional printing in which the binder immobilization process is controlled.

Specifically, the active ingredient of the binder composition is colloidal silica, preferably comprising amorphous spherules dispersed in a liquid medium such as distilled water to form a sol. After printing onto a layer of ceramic powder, the colloidal silica forms a gel before drying in the powder bed. The binder catalyst is polyethylene glycol or another ethylene oxide-derived polymer. This catalyst promotes gelation if the pH of the binder composition is below a predetermined value, approximately 7.5 for colloidal silica. Accordingly, to preclude gelation during storage and passage through an ink jet printhead, the composition includes a base substance which maintains the pH above the predetermined value. The preferred base, triethanolamine, maintains the pH of colloidal silica approximately between 9 and 9.5, which is within the range of maximum stability for the colloidal silica and is most compatible with the stainless steel and nickel printhead components. After printing, the pH is reduced below the predetermined value, thereby causing the binder to gel in the powder. In the preferred embodiment, the pH is reduced by adding an acid, preferably citric acid, to the powder. The pH can be reduced by other mechanisms, however, such as by applying gaseous $CO_2$ to the powder after printing.

The binder composition and related process are particularly useful for printing ceramic shell molds for metal casting.

BRIEF DESCRIPTION OF THE DRAWINGS

The invention will be more fully understood from the following detailed description taken in conjunction with the accompanying drawings in which.

DETAILED DESCRIPTION OF THE INVENTION

Figure 1:
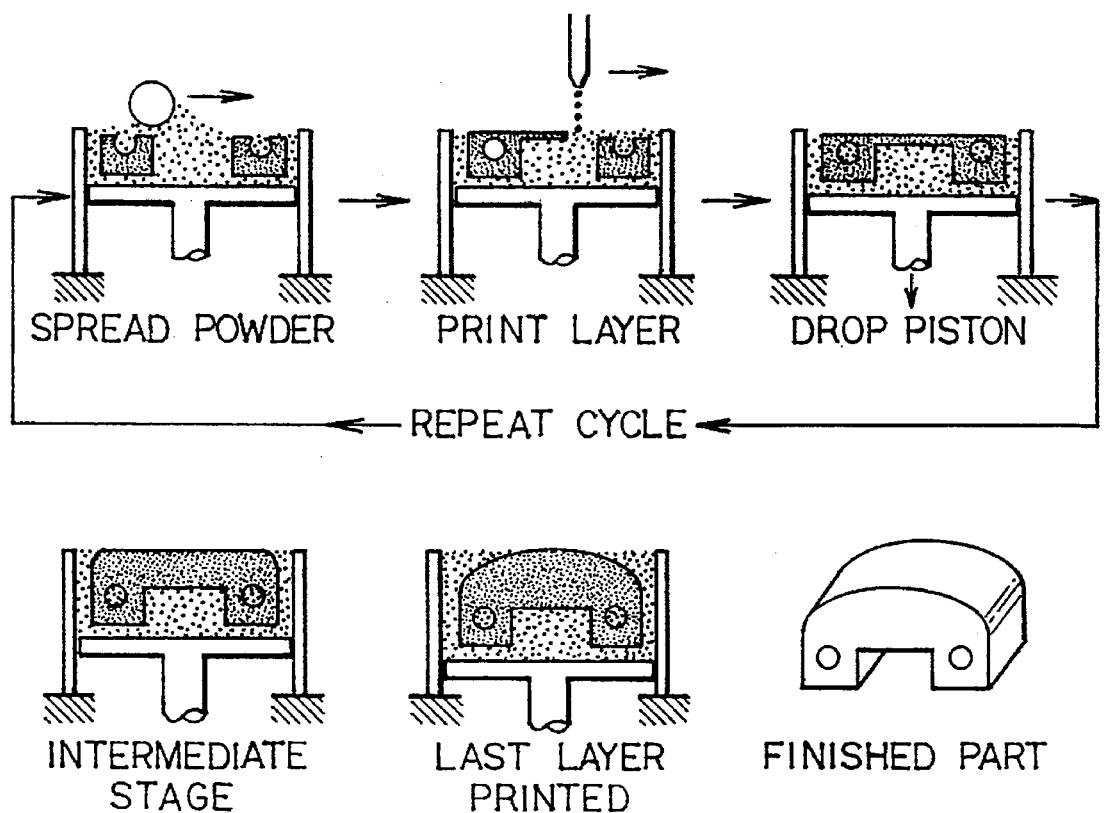
FIG. 1 is a schematic illustration of a prior art three dimensional printing process.
Figure 2:
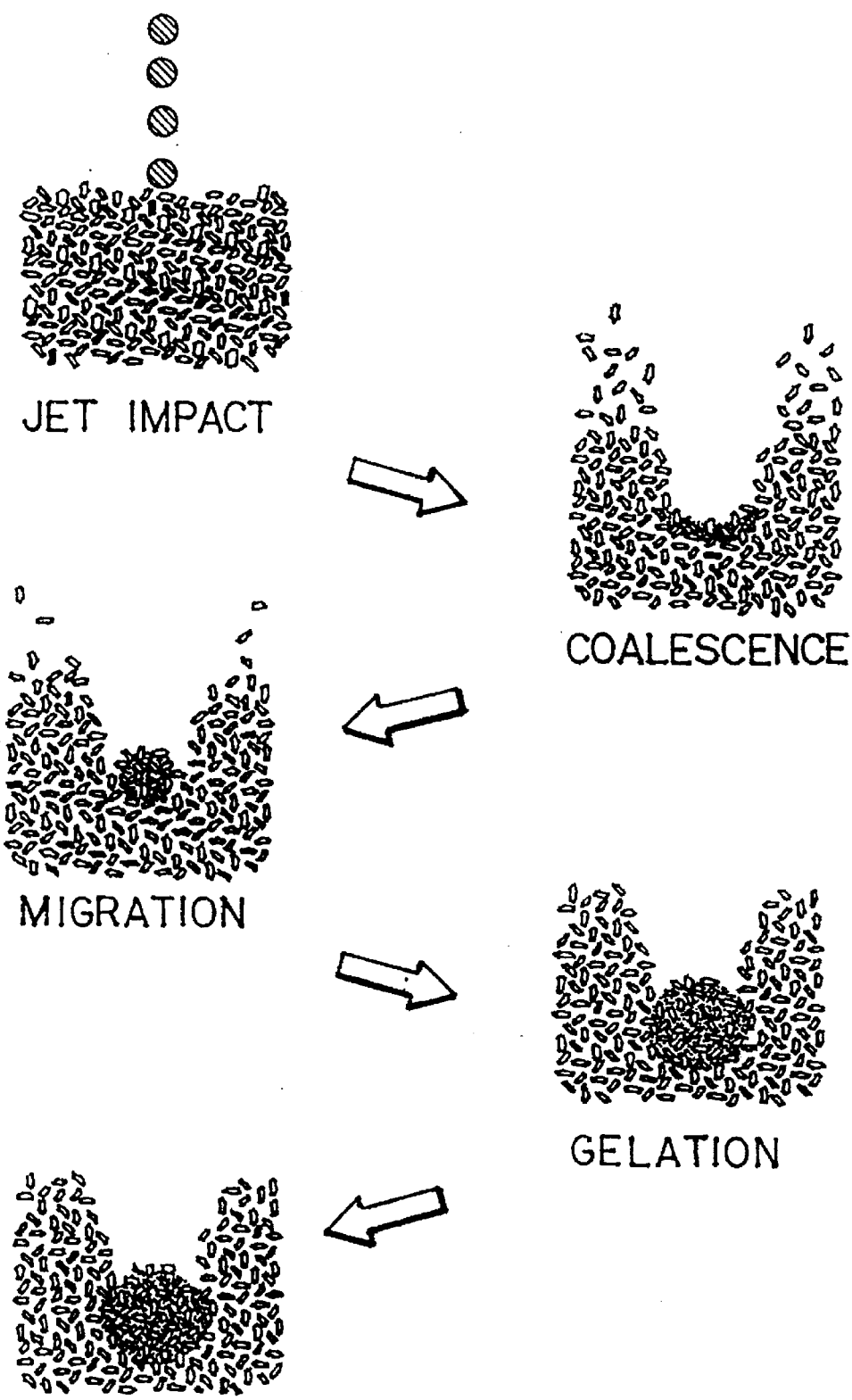
FIG. 2 is a schematic illustration of the sequence of droplet impact to immobilization.

A colloidal binder composition must be a well-dispersed, stable fluid to withstand prolonged storage, must be inert with respect to the printhead materials, and must have a sufficient volume fraction of solids. The viscosity must be low enough that it can be forced through the nozzle at the desired rate. It must be stable under moderate shear in tubing, filtration, and the pumping mechanism and with respect to the large transient shear rate that is encountered in jet formation, avoid excessive wear to the orifice when passing through it, and present a stable meniscus to the outside surface of the nozzle. The composition must be miscible with the rinse solution and should dry slowly and be easy to clean up. Once the liquid encounters the powder bed, the stability requirement is reversed: the solids from the suspension must deposit on powder grains and join them together. Thus, the dispersion must be stable, yet not so stable that it fails to flocculate or gel to stick to powder grains under the conditions that exist in the powder bed.

A binder composition according to the present invention comprises colloidal silica dispersed in a fluid dispersing medium, a catalyst to promote gelation of the binder composition when the pH of the composition is below a predetermined value, and a base able to maintain the pH of the binder composition above the predetermined value at which the binder composition gels.

The colloidal silica is an aqueous dispersion of spherical particles of amorphous silica, also called silica sol, commercially available in uniform particle sizes ranging from 5 nm to 100 nm. Nyacol 9950, available from Eka-Nobel, has been found to be suitable. It has a particle size of 100 nm and a solids loading of 50% by weight (33% by volume). Larger particle sizes are preferable, since they permit more solids to be loaded into the suspension without losing stability. The NyaCol 9950 should be prefiltered to 5 μm to remove any large inclusions which may be present.

The fluid dispersing medium is preferably distilled water. The Nyacol/water balance is typically maintained with the silica at approximately 17.5% by volume. The colloidal silica should be present in the water to at least 6 to 10% by volume (12 to 20% by weight) to form a bond between powder. The maximum amount of silica is preferred. However, for ease of handling, the suspension is generally diluted to below 20% by volume (32% by weight).

The binder composition also includes a base to maintain the pH above the predetermined pH value to prevent premature coagulation. For colloidal silica, the base should be chosen to hold the pH between 9 and 10, which is the range of maximum stability of the colloidal silica and is most compatible with the stainless steel and nickel printhead components. The quantity of the base is determined by the amount of citric acid normally present in the powder: the amount must be sufficient to allow the binder pH to drop to 7 or lower in the powder bed. The quantity of the base must also be sufficient to overwhelm the effect of impurities that may be picked up during storage. For example, $CO_2$ in air is mildly acidic and will cause the pH of a very weak solution to change.

Triethanolamine (TEA, 2-2'-2" Nitrilotriethanol), a weak base, has been found to be suitable. Preferably, a concentration of approximately 2% by weight of the total composition is sufficient to hold the pH of the binder at about 9 to 9.5. TEA is also advantageous, because it does not precipitate or evaporate when the binder dries. Therefore, the dried binder still has a high pH and is easy to redisperse, which aids in clean up if the binder dries on the printhead or catcher.

Other bases which do not react adversely with the other components can also be used. For example, tetramethylammonium hydroxide (TMAH), ammonia, and morpholine were tested and found to be suitable. Ammonia, being a stronger base than, for example, TEA, is able to raise the pH of the binder to almost 10 at a concentration of 0.5% by weight. In general, a concentration of approximately 0.5% by weight of a suitable base should be sufficient. Some strong inorganic bases, such as sodium hydroxide, should have their concentrations kept to a minimum, since larger concentrations can destabilize the colloid and impair the mechanical properties of the finished ceramic.

The coagulation ability of the bases TEA, TMAH, ammonia, and morpholine was tested by measuring the light transmission through samples of colloidal silica mixed with varying amounts of each of the bases to which varying amounts of citric acid were added. TMAH had the greatest coagulating ability at the lowest concentration, as low as 0.01 mol/l at pH 5.5. Both morpholine and TEA had similar coagulating ability, at a concentration of approximately 0.05 mol/l at pH 5.5. Ammonia had the least coagulating ability, at a concentration of approximately 0.2 mol/l at pH 5.5.

The age stability of the four bases was also tested by heating the samples of binder and base to simulate storage for two months. TMAH exhibited the largest drop in pH. The pH of the mixtures with ammonia also declined at the lower concentrations of ammonia. Morpholine and TEA exhibited relatively no change in pH.

When binder dries, it is desirable that the base not evaporate out of the gel. This permits the gel to be redispersed when water is added back, which greatly aids in cleaning of the printhead components and prevents the formation of a solid crust on dried tube fittings. Both morpholine and TEA are liquids at room temperature. Morpholine has a boiling point of 130° C., and TEA has a boiling point of 278° C. The higher boiling point of TEA suggests it would evaporate the least. Thus, TEA appears to be a preferred base to raise the pH of the binder.

With TEA, a catalyst is required to coagulate the binder in the lower pH environment of the powder bed. The preferred binder catalyst is polyethylene glycol (PEG) or another ethylene oxide-derived polymer. This catalyst promotes gelation if the pH of the binder composition is below approximately 7.5. The optimum molecular weight of the PEG component is at least 14,000 and preferably approximately 20,000 (or a degree of polymerization of at least 400 to 600). The higher the molecular weight, the less is needed to coagulate the binder. However, molecular weights in excess of 35,000 inhibit the breakup of the jet exiting the printhead nozzle.

Silica below a pH of 7.5 has a substantial amount of hydrogen ions adsorbed onto it. The PEG has a lot of oxygen in its ether bonds which are attracted to the hydrogen in the silica. The phenomenon is fairly reversible; thus, if the binder pH is increased, it can be mostly redispersed. Only a small amount of PEG is needed to gel the binder. Amounts as small as 0.001% by weight of the total composition or 100 ppm are sufficient. Typically, 0.1% is used, although the amount can be greater. However, too much PEG causes the silica to become stable at all pHs and defeats the gelation mechanism. This upper limit depends on the particle size and concentration of the colloid, since it corresponds to the point at which the silica particles become completely coated with the polymer.

It is desirable to add a humectant to retard drying of the binder composition. This slows down buildup of the binder in the printhead catcher and drying at the nozzle, enabling the printhead to be stopped and restarted within a few minutes without difficulty. Propylene glycol (1-2 propanedial) is the preferred humectant. Ethylene glycol may also be used, although it is toxic. Glycol also seems to soften the binder gel which aids cleaning of the printhead components and may reduce distortion during printing. As a cosolvent, its presence probably improves the binder's solubility for organic impurities which can contribute to jet instability. An amount of approximately 5% by weight of the total composition has been found to be suitable to allow the printhead to be restarted after remaining idle and filled with binder for about one hour, which is usually adequate time for servicing, and to prevent drying on the waste gutter.

Experiments were conducted on the time it took a nozzle to clog after standing with a binder composition containing varying amounts of ethylene glycol. For compositions with less than 10% by volume glycol, the time to clog ranged from 2 to 16 minutes. For 10% glycol, the time to clog ranged from 30 minutes to 1 hour. For 25% glycol, the time to clog was several days, and for 50% glycol, the nozzle remained unclogged after 19 days. Since the printhead components can generally be serviced within an hour, 10% by volume glycol should generally be sufficient. Other experiments indicated that ethylene glycol has no significant effect on the coagulation of colloidal silica by TEA.

It is also desirable to add a cosolvent to keep organic impurities from precipitating onto the printhead components. For example, an ion exchange resin is an impurity that comes in the Nyacol 9950. Two percent by weight of butyl carbitol (diethylene glycol monobutyl ether, 1-(2-Butoxyethoxy) ethanol) has been found useful in this regard. However, the butyl carbitol reduces the surface tension somewhat and leads to foaming, which can impair the printhead. Thus, the butyl carbitol can be omitted. Alternatively, the antifoaming agent Antifoam 1500 available from Dow Corning, which is an emulsion containing methylated silica and polydimethylsiloxane, can be added.

A pH indicator may be added to the binder composition to provide a visual indication of the pH of the binder composition. It can be used to monitor the condition of the binder during storage and recycling and to assess the acid content of the powder bed. A suitable pH indicator is thymol blue, which is blue above pH 8 and yellow at pH 7 or below. If citric acid is used in the powder bed to reduce the pH to cause the silica to gel, the thymol blue should cause the printed layers to be yellow or red. If the printed layers are green or blue, then not enough citric acid is present. The ideal mix is yellow with red dots around the citric acid granules. Thymol blue may be added in amounts sufficient to provide a visual indication. For example, approximately 0.125 g/liter provides a suitable blue color.

Citric acid is added to the powder layer to trigger coagulation of the binder. The acid must be sufficiently concentrated so that it lowers the binder pH below the gelation threshold of about 7.5. It is desirable to use two or three times the minimum amount in the powder, so that some segregation of the citric acid in the powder can be tolerated and to increase the rate of gel growth. A citric acid concentration of 0.2 to 0.5% by weight has been found to be sufficient. This acid combination with the base TEA possess long-term stability after formulation prior to printing, can be easily burned out of the printed material, are nonvolatile at ambient conditions, and do not pose any severe health hazard.

To make the binder composition according to the preferred embodiment, the following components are combined and mixed thoroughly to dissolve the solids:

| | | |
|---|---|---|
| distilled water | 385.9 cc | (385.9 g) |
| propylene glycol | 58.4 cc | (65.1 g) |
| triethanolamine | 21.7 cc | (24.4 g) |
| diethylene glycol monobutyl ether | 12.6 cc | (12.2 g) |
| polyethylene glycol | 1.0 g | |
| thymol blue | 0.5 g | |

To this mixture, 525.0 cc (735.0 g) of Nyacol 9950 are added. The silica appears to flocculate upon mixing. According, this mixture should be allowed to stand for a time or should be filtered by pumping in a closed circuit through a 5 μm filter for a time to redisperse the flocs.

The specific gravity of this mixture is 1.21 for 17.5 vol. % silica. The pH is between 9 and 9.5. The viscosity is approximately 2 to 3 cP (0.002 to 0.003 Pa-s). The surface tension is 54 dyn/cm (0.054 Pa-m).

Other methods to reduce the pH of the binder composition to cause gelation are possible. For example, gaseous $CO_2$ can be applied to each layer of the powder after printing of the binder.

The invention is not to be limited by what has been particularly shown and described except as indicated by the appended claims.

I claim:

1. A binder composition for use in three dimensional printing comprising:
   a fluid dispersing medium;
   silica in a solid particulate form dispersed in the fluid dispersing medium;
   a catalyst able to promote gelation of the binder composition when the binder composition is below a predetermined pH value;
   a base able to maintain the pH of the binder composition above the predetermined value at which the binder composition gels.

2. The binder composition of claim 1, wherein the fluid dispersing medium comprises distilled water.

3. The binder composition of claim 1, wherein the base comprises triethanolamine.

4. The binder composition of claim 3, wherein the concentration of the triethanolamine is approximately 2 percent by weight.

5. The binder composition of claim 1, wherein the base comprises triethanolamine, tetramethylammonium hydroxide; ammonia, or morpholine.

6. The binder composition of claim 5, wherein the concentration of the base is approximately 0.5 percent by weight.

7. The binder composition of claim 1, wherein the base is able to maintain the pH of the binder composition above 7.5.

8. The binder composition of claim 1, wherein the base is able to maintain the pH of the binder composition between 9 and 9.5.

9. The binder composition of claim 1, wherein the base comprises an organic base.

10. The binder composition of claim 1, wherein the silica is amorphous.

11. The binder composition of claim 1, wherein the silica comprises at least 10 percent by volume of the binder composition.

12. The binder composition of claim 1, wherein the silica comprises at least 17.5 percent by weight of the binder composition.

13. The binder composition of claim 1, wherein the silica comprises approximately 30 percent by weight of the binder composition.

14. The binder composition of claim 1, wherein the particle size of the silica is approximately 100 nm.

15. The binder composition of claim 1, wherein the catalyst comprises a polymer made from an ethylene oxide.

16. The binder composition of claim 15, wherein the polymer made from ethylene oxide comprises polyethylene glycol.

17. The binder composition of claim 15, wherein the polymer made from ethylene oxide is provided at a concentration of at least 100 ppm.

18. The binder composition of claim 15, wherein the molecular weight of the polymer made from ethylene oxide is between 400 and 35,000.

19. The binder composition of claim 15, wherein the molecular weight of the polymer made from ethylene oxide is at least 14 000.

20. The binder composition of claim 15, wherein the molecular weight of the polymer made from ethylene oxide is approximately 20,000.

21. The binder composition of claim 15, wherein the concentration of the polymer made from ethylene oxide is approximately 0.1 percent by weight.

22. The binder composition of claim 1, further comprising a pH indicator.

23. The binder composition of claim 22, wherein the pH indicator comprises thymol blue.

24. The binder composition of claim 1, further comprising a humectant.

25. The binder composition of claim 24, wherein the humectant comprises ethylene glycol or propylene glycol.

26. The binder composition of claim 1, further comprising a solvent to inhibit precipitation of impurities.

27. The binder composition of claim 26, wherein the solvent comprises butyl carbitol.

28. The binder composition of claim 27, wherein the butyl carbitol is provided at a concentration of approximately 1 percent by weight.

29. The binder composition of claim 26, wherein the solvent comprises an emulsion comprising methylated silica and polydimethylsiloxane.

* * * * *

UNITED STATES PATENT AND TRADEMARK OFFICE
CERTIFICATE OF CORRECTION

PATENT NO. : 5,660,621
DATED : August 26, 1997
INVENTOR(S) : Bredt

It is certified that error appears in the above-indentified patent and that said Letters Patent is hereby corrected as shown below:

Column 1, insert the followings, before Background of the Invention:

--GOVERNMENT RIGHTS

The U.S. Government has certain rights in this invention pursuant to Contract No. 9215728-DDM, awarded by the National Science Foundation.--

Column 6, line 22 in claim 5, "hydroxide;" should read --hydroxide,--. comma after hydroxide:

Signed and Sealed this

Second Day of December, 1997

Attest:

BRUCE LEHMAN

*Attesting Officer*   *Commissioner of Patents and Trademarks*